(12) United States Patent
Weiher et al.

(10) Patent No.: US 10,578,168 B2
(45) Date of Patent: Mar. 3, 2020

(54) SYNCHRONIZER RING FOR A SYNCHRONIZATION UNIT AND METHOD FOR MANUFACTURING A SYNCHRONIZER RING

(71) Applicant: HOERBIGER ANTRIEBSTECHNIK HOLDING GMBH, Schongau (DE)

(72) Inventors: Christian Weiher, Lechbruck am See (DE); Martin Kees, Kaltental (DE)

(73) Assignee: HOERBIGER ANTRIEBSTECHNIK HOLDING GMBH, Schongau (DE)

( * ) Notice: Subject to any disclaimer, the term of this patent is extended or adjusted under 35 U.S.C. 154(b) by 166 days.

(21) Appl. No.: 15/804,401

(22) Filed: Nov. 6, 2017

(65) Prior Publication Data
US 2018/0128324 A1 May 10, 2018

(30) Foreign Application Priority Data
Nov. 7, 2016 (DE) .......................... 10 2016 121 174

(51) Int. Cl.
*F16D 23/02* (2006.01)
*F16D 23/06* (2006.01)
*F16D 13/24* (2006.01)

(52) U.S. Cl.
CPC ............ *F16D 23/025* (2013.01); *F16D 13/24* (2013.01); *F16D 2250/0023* (2013.01)

(58) Field of Classification Search
CPC ..................................................... F16D 23/025
See application file for complete search history.

(56) References Cited

U.S. PATENT DOCUMENTS

| 4,597,484 A * | 7/1986 | Takiguchi | F16D 23/025 192/107 M |
| 4,866,831 A * | 9/1989 | Lanzerath | F16D 23/025 29/893 |
| 2015/0354638 A1* | 12/2015 | Negele | F16D 23/025 192/107 R |

* cited by examiner

*Primary Examiner* — Charles A Fox
*Assistant Examiner* — Ryan P Dood
(74) *Attorney, Agent, or Firm* — McNees Wallace & Nurick LLC

(57) ABSTRACT

A synchronizer ring for a synchronization unit has a substantially constant sheet-metal cone which tapers in direction of its ring axis from a first axial cone end towards a second axial cone end. At the sheet-metal cone a centering collar is integrally molded and the sheet-metal cone includes a first sheet portion and axially adjacent a second sheet portion. In addition, the sheet-metal cone includes a step portion which axially extends between the second axial cone end and the first sheet portion, wherein a radial outer side of the step portion is offset with respect to a radial outer side of the first sheet portion towards the ring axis. Furthermore, there is shown a method for manufacturing a synchronizer ring.

18 Claims, 4 Drawing Sheets

SYNCHRONIZER RING FOR A SYNCHRONIZATION UNIT AND METHOD FOR MANUFACTURING A SYNCHRONIZER RING

FIELD OF THE INVENTION

This invention relates to a synchronizer ring for a synchronization unit of a manual transmission.

Furthermore, the invention relates to a method for manufacturing such synchronizer ring.

BACKGROUND

Such synchronizer rings must be centered relative to the synchronizer hub of the manual transmission, in order to ensure a safe and low-wear operation of the synchronization unit. The radial centering of the synchronizer ring relative to the synchronizer hub is effected by the centering collar which can rest against the synchronizer hub.

Such synchronizer rings usually are manufactured from a flat sheet by a stamping and drawing method with a succeeding forming step. The centering collar only is formed by the forming step, namely in that in the sheet-metal cone the first sheet portion is integrally molded by a tool, whereby the centering collar is obtained in the second sheet portion by material forming.

To enable the centering collar to ensure effective centering at any time, the centering collar must have a sufficient collar thickness at least in the second sheet portion or, in other words, the centering collar must be sufficiently high. The material for forming the centering collar however chiefly is removed from the first sheet portion, so that an increase of the collar thickness and hence of the centering collar is not easily possible without too much weakening the sheet-metal cone in the first sheet portion.

Correspondingly, it is the object of the invention to provide a synchronizer ring for a synchronization unit and a method for manufacturing a synchronizer ring, in which the second sheet portion can reliably be designed with a high collar thickness without the sheet-metal cone being excessively weakened in the first sheet portion.

SUMMARY

The present invention provides a synchronizer ring for a synchronization unit of a manual transmission, which includes a ring axis and a ring-shaped sheet-metal cone with a substantially constant ring thickness, wherein the ring-shaped sheet-metal cone has a radial outer side and an opposite radial inner side with a cone-shaped friction surface, and wherein the ring-shaped sheet-metal cone tapers in direction of the ring axis from a first axial cone end towards a second axial cone end. On the radial outer side the sheet-metal cone includes an integrally molded centering collar for radially centering the synchronizer ring relative to a synchronizer hub of the synchronization unit, wherein the sheet-metal cone is deformed in the region of the centering collar and includes a first sheet portion with a residual thickness reduced as compared to the ring thickness and axially adjacent a second sheet portion with a collar thickness which at least corresponds to the ring thickness. The sheet-metal cone includes a step portion which axially extends between the second axial cone end and the first sheet portion, wherein a radial outer side of the step portion is offset with respect to a radial outer side of the first sheet portion towards the ring axis. The step portion can be axially adjacent to the first sheet portion and/or to the second axial cone end. In this way, in the manufacture of the synchronizer ring not only the material from the region of the first sheet portion, but also the material that has been removed for forming the step portion can be used, without further weakening the first sheet portion. As a result, the centering collar or the collar thickness of the second sheet portion can be formed higher than would be possible without the step portion and without additional material having to be applied on the sheet-metal cone. As a result, the synchronizer ring can still be efficiently manufactured from a flat sheet.

For example, the radial outer side of the step portion and/or the radial outer side of the first sheet portion extends substantially parallel to the ring axis, so that the manufacture is simplified further.

In one embodiment of the invention, the radial distance between the radial outer side of the step portion and the friction surface is constant axially along the step portion, whereby the synchronizer ring is designed particularly stable.

Preferably, the residual thickness of the sheet metal cone is substantially constant in the first sheet portion, so that the sheet-metal cone also is designed very stable in the first sheet portion.

In one aspect of the invention the sheet-metal cone has a bottom at its second axial cone end, which proceeding from the sheet-metal cone extends radially towards the ring axis. The bottom can completely close the second axial cone end. The step portion is provided in the region of the bottom. In this way, the synchronizer ring is stabilized by the bottom portion such that the loss of material by the step portion does not lead to a significant weakening of the synchronizer ring.

For example, the radial distance between the radial outer side of the step portion and the radial outer side of the first sheet portion is greater than the ring thickness or the residual thickness, so that a particularly large amount of material can be provided, in order to further increase the height of the centering collar.

In axial direction, the step portion can be shorter than the bottom, whereby the stability of the synchronizer ring is further improved.

In one aspect of the invention the step portion is approximately U-shaped in cross-section vertically to the ring axis, so that the material removed at the step portion effectively is transported into the second sheet portion.

In one design variant, the step portion includes a wall at its axial end facing the first sheet portion, wherein in the wall an undercut is formed and/or the wall is inclined towards the second axial cone end. The transport of the material removed from the step portion can be further improved thereby.

For example, the sheet-metal cone is bent radially to the outside at its first axial cone end and includes locking teeth. In this way, a synchronizer ring with locking teeth also can easily be realized.

In one aspect of the invention the centering collar includes a radial abutment surface for the synchronizer hub, whereby the position of the synchronizer ring can be specified precisely.

For example, the centering collar is interrupted in circumferential direction, so that the manufacture of the synchronizer ring is simplified.

In one design variant of the invention the centering collar comprises several centering collar portions spaced in circumferential direction. The centering collar portions can be uniformly distributed around the circumference of the ring-shaped sheet-metal cone. In this way, the number of required centering collar portions can be reduced.

Preferably, each of the centering collar portions includes a radial abutment surface for the synchronizer hub, and all radial abutment surfaces lie on a circular cylinder, whereby the position of the synchronizer ring relative to the synchronizer hub can be adjusted precisely.

For example, at least three centering collar portions are provided, so that centering of the synchronizer ring is further improved.

In one design variant a first centering collar portion has a first axial distance and a second centering collar portion has a second axial distance different from the first axial distance to the second axial cone end. Centering collar portions lying one behind the other can transition into each other directly in circumferential direction, and the centering collar extends in circumferential direction in a wave-shaped manner. In this way, centering of the synchronizer ring always is ensured with different axial positions of the synchronizer ring with respect to the synchronizer hub.

The object furthermore is solved by a method for manufacturing a synchronizer ring as described above, comprising the following steps:

a) providing a ring-shaped sheet-metal cone which conically tapers in direction of the ring axis from a first axial cone end towards a second axial cone end and does not yet have a centering collar, b) adjusting a first tool to a desired first radial position for integrally molding the step portion at the second axial cone end, and c) shifting the first tool by forming the material in direction of the first axial cone end substantially parallel to the friction surface of the sheet-metal cone or substantially parallel to the ring axis.

In this way, material from the step portion is transported axially in direction of the first axial cone end, which then is available for producing the centering portion, so that the centering portion can be formed higher.

Preferably, a second tool, after the first tool has been shifted, is adjusted to a desired second radial position for integrally molding the centering collar at the second axial cone end and by forming the material then is shifted in direction of the first axial cone end substantially parallel to the friction surface of the sheet-metal cone or substantially parallel to the ring axis. The centering collar is formed thereby, and the second radial position can be further away from the ring axis than the first radial position. In this way, the centering collar can be manufactured effectively and at low cost.

The first tool can be identical to the second tool, whereby a particularly inexpensive and effective manufacture of the synchronizer ring becomes possible.

DETAILED DESCRIPTION

Figure 1:
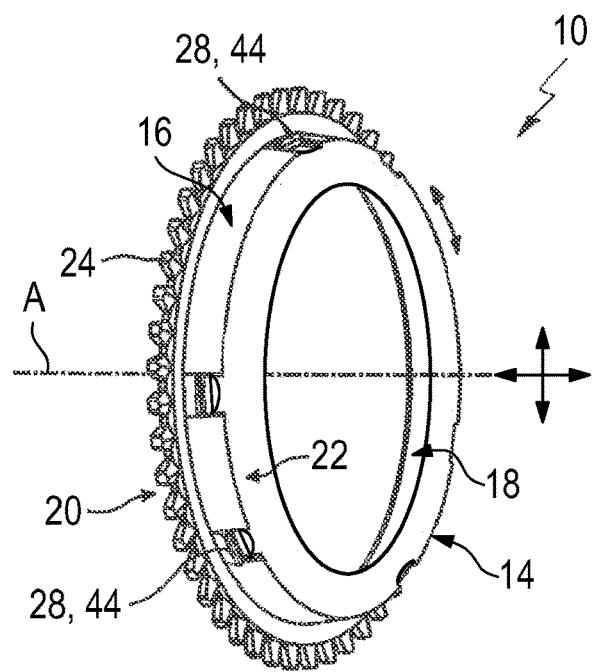
FIG. 1 shows a perspective view of a synchronizer ring according to the invention.
Figure 2:
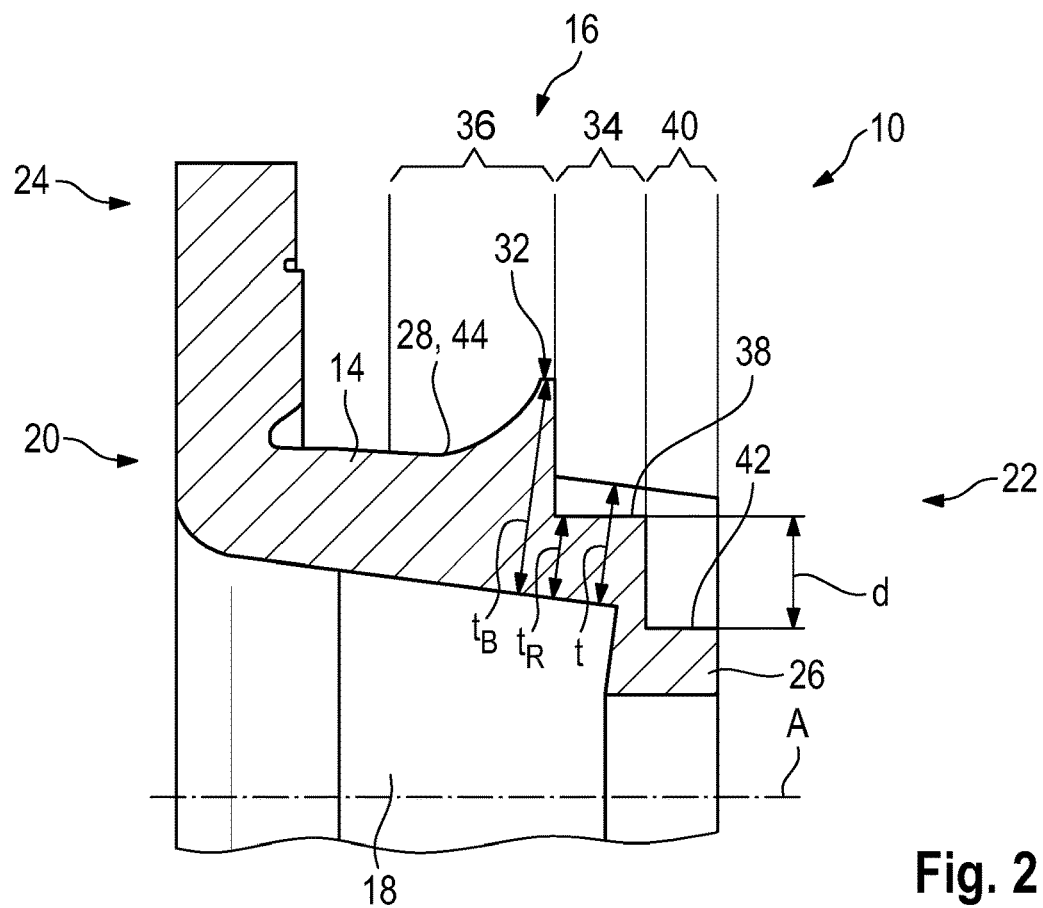
FIG. 2 shows the synchronizer ring according to FIG. 1 in a partly sectional view.
Figure 3:
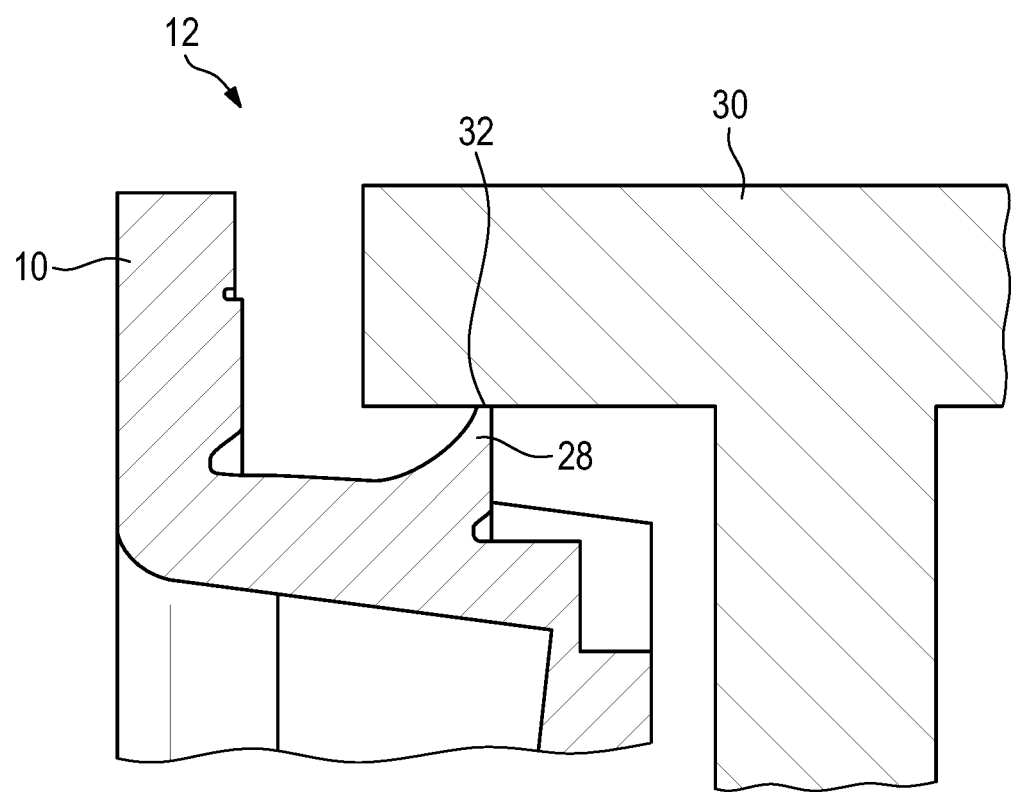
FIG. 3 shows the sectional view of the synchronizer ring according to FIG. 2 together with a synchronizer hub of a manual transmission.

FIGS. 1 to 3 show a synchronizer ring 10 for a synchronization unit 12 of a manual transmission, which has a ring axis A and is formed of a ring-shaped sheet-metal cone 14 with a substantially constant ring thickness t.

The ring-shaped sheet-metal cone 14 has a cone-shaped radial outer side 16 as well as an opposite radial inner side with a cone-shaped friction surface 18, wherein the ring thickness t corresponds to a dimension of the sheet-metal cone 14 vertical to the friction surface 18.

The sheet-metal cone 14 tapers from a first axial cone end 20 to a second axial cone end 22.

At its first axial cone end 20 the sheet-metal cone 14 is bent radially to the outside and includes locking teeth 14.

At its second cone end 22 the sheet-metal cone 14 has an end-face bottom 26 which at the second axial cone end 22 extends from the sheet-metal cone 14 radially towards the ring axis A.

In the embodiment shown in FIGS. 1 to 3 the bottom 26 is not designed closed, but has an opening.

Furthermore, the sheet-metal cone 14 has an integrally molded centering collar 28 on the radial outer side 16 for radially centering the synchronizer ring 10 relative to a synchronizer hub 30 (FIG. 3) of the synchronization unit 12.

On its side facing away from the sheet-metal cone 14 the centering collar 28 has a flat, radial abutment surface 32 for the synchronizer hub 30.

In the region of the centering collar 28 the sheet-metal cone 14 is deformed with a first sheet portion 34 and a second sheet portion 36.

In the first sheet portion 34 the sheet-metal cone 14 has a residual thickness $t_R$ reduced as compared to the ring thickness t and a radial outer side 38 which in the illustrated embodiment extends substantially parallel to the ring axis A.

The second sheet portion 36 adjoins the first sheet portion 34 towards the first axial cone end 20. In the second sheet portion 36 the sheet-metal cone 14 has a collar thickness $t_B$ which at least corresponds to the ring thickness t, but in particular is greater than the ring thickness t. The collar thickness $t_B$ is a measure for the height of the centering collar 28.

On the side of the first sheet portion 34 facing the second axial cone end 22 the sheet-metal cone 14 includes a step portion 40 which extends from the second axial cone end 22.

In the illustrated embodiment, the step portion 40 extends up to the first sheet portion 34. This means that in this embodiment the first sheet portion 34 adjoins the step portion 40.

In axial direction, the step portion 40 is shorter than the bottom 26.

The step portion 40 likewise has a radial outer side 42, wherein the radial outer side 42 of the step portion 40 is offset by a distance d with respect to the radial outer side 38 of the first sheet portion 34 towards the ring axis A. In other words, the step portion 40 forms a downward step proceeding from the first sheet portion 34 towards the second axial cone end 22.

The distance d between the radial outer side 42 of the step portion 40 and the radial outer side 38 of the first sheet portion 34 can be greater than the ring thickness t and/or the residual thickness $t_R$.

The step portion 40 can be formed about U-shaped at the second axial cone end 22 in a cross-section vertical to the ring axis A. In this case, the radial outer side 42 of the step portion 40 is the region between the legs of the U.

In the illustrated embodiment, the radial outer side 42 of the step portion 40 extends substantially parallel to the ring axis A. In this embodiment, the outer side 42 of the step portion 40 and the outer side 38 of the first sheet portion 34 thus likewise are parallel to each other.

In the illustrated embodiment, the centering collar 28 of the sheet-metal cone 14 is not continuous, but interrupted in circumferential direction, so that several centering collar portions 44 spaced in circumferential direction are formed, which are distributed around the circumference of the ring-shaped sheet-metal cone 14. In the embodiment shown in FIG. 1, six centering collar portions 44 are provided.

In FIG. 1, groups of two centering collar portions 44 each are uniformly distributed around the circumference of the sheet metal cone 14. It also is conceivable, however, that the centering collar portions 44 individually are uniformly distributed around the circumference of the sheet-metal cone 14.

The centering collar portions 44 each have a radial abutment surface 32 for the synchronizer hub 30. The abutment surfaces 32 of the centering collar portions 44 all lie on an imaginary circular cylinder.

FIG. 3 shows the synchronizer ring 10 as part of a synchronization unit 12 of a manual transmission together with the synchronizer hub 30 of the synchronization unit 12. This representation clearly shows that the abutment surface 32 of the centering collar 28 rests against the inner side of the synchronizer hub 30, so that the synchronizer ring 10 is securely mounted in radial direction in a centered way.

Figure 4A:
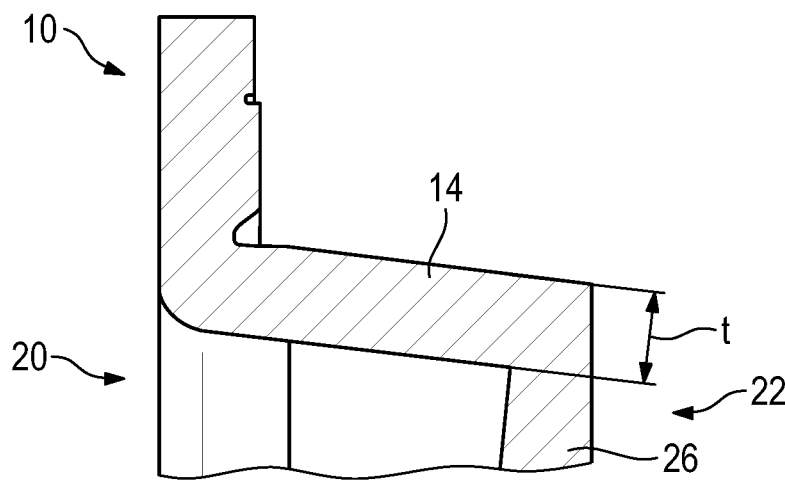
FIGS. 4a to 4c show a partly sectional view of the synchronizer ring during various steps of the method according to the invention.

For manufacturing the synchronizer ring 10 a flat sheet initially is deep-drawn, so that the sheet-metal cone 14 is formed together with the bottom 26, as it is shown in FIG. 4a. At this time, the sheet-metal cone 14 does not yet have a centering collar 28.

At the same time, the locking teeth 24 also can be incorporated on deep-drawing.

The step portion 40 as well as the centering collar 28 subsequently are produced by means of a tool 46.

For this purpose, the tool 46 is arranged at the first axial cone end 20 and adjusted to a desired first radial position, i.e. with a first distance to the ring axis A.

The tool 46 then is shifted in direction towards the first axial cone end 20 parallel to the ring axis A. The sheet-metal cone 14 is formed and material is pressed from the second axial cone end 22 in direction of the first axial cone end 20. In this way, the step portion 40 is formed.

Figure 4B:
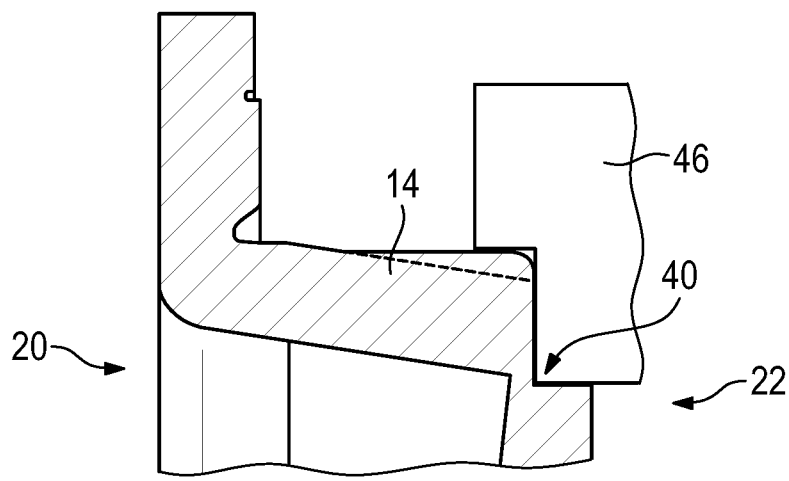

Due to the forming of material, material of the sheet-metal cone 14 now piles up on the radial outer side of the sheet-metal cone 14 in the region of the first sheet portion 34. In FIG. 4b this is indicated by the broken line, which symbolizes the radial outer side of the non-deformed sheet-metal cone 14.

In a further step the tool 46 now is arranged at the second axial cone end 22 in a second desired radial position, i.e. at a second distance to the ring axis A.

The second radial position is further away from the ring axis A than the first radial position, i.e. in the second radial position the tool 46 has a larger distance to the ring axis A than in the first radial position.

In turn, the tool 46 now is shifted in direction towards the first cone end 20 parallel to the ring axis A. Both parts of the original sheet-metal cone 14 and material piled up thereon are moved further in direction of the first cone end 20, whereby the centering collar 28 is formed.

Figure 4C:
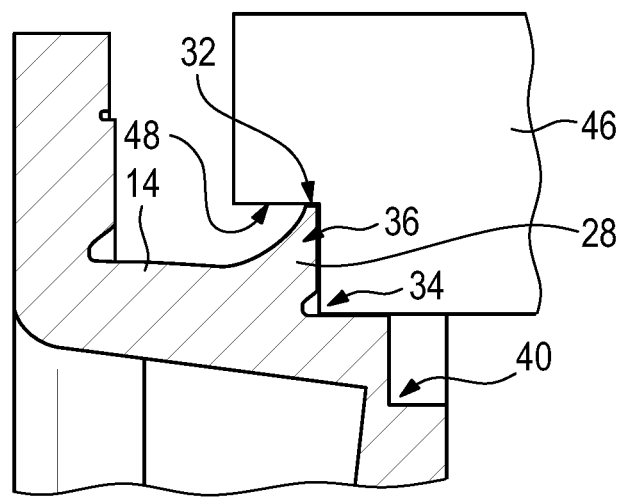

The abutment surface 32 is formed by a boundary surface 48 on the tool 46 (FIG. 4c).

In this step, the centering collar 28 hence is formed with the first sheet portion 34 and the second sheet portion 36. Subsequently, the tool 46 again is moved in direction of the second axial cone end 22 and the synchronizer ring 10 thereby is completed.

In the illustrated embodiment the same tool 46 is used both for integrally molding the step portion 40 and for integrally molding the centering collar 28. It also is conceivable, however, that a first tool can be used for integrally molding the step portion 40 and a second tool for integrally molding the centering collar 28.

Figure 5:
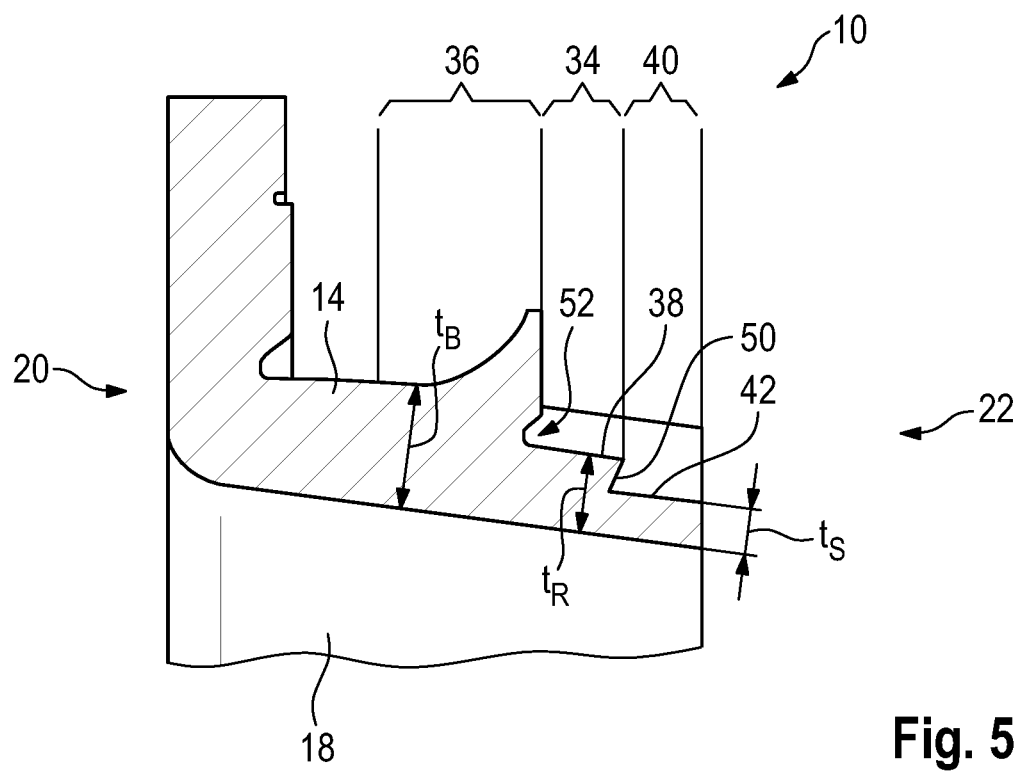
FIG. 5 shows a second embodiment of a synchronizer ring according to the invention partly in section.
Figure 6:
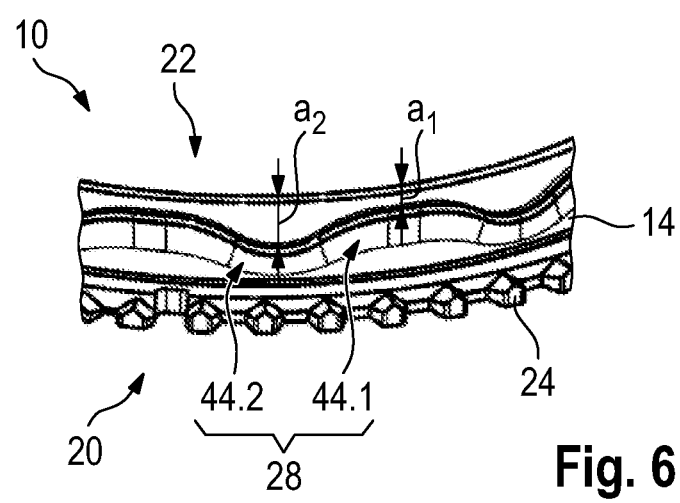
FIG. 6 shows a section of a side view of a third embodiment of a synchronizer ring according to the invention.

FIGS. 5 and 6 show further embodiments of the synchronizer ring 10, which in essence correspond to the first embodiment. In the following, only the differences therefore will be discussed, wherein identical and functionally equivalent parts are provided with the same reference numeral.

The synchronizer ring 10 of the second embodiment as shown in FIG. 5 has no bottom and can completely be provided with the friction surface 18 on its radial inner side.

In the second embodiment, the outer sides 42, 38 of the step portion 40 and of the first sheet portion 34 are not parallel to the ring axis A, but extend parallel to the friction surface 18. The radial distance is between the radial outer side 42 of the step portion 40 and the friction surface 18 therefore is constant in axial direction along the step portion 40.

The residual thickness $t_R$ of the sheet-metal cone 14 thereby also is substantially constant in the first sheet portion 34.

Furthermore, the step portion 40 has a wall 50 at its end facing the first sheet portion 34. At the wall 50, the first sheet portion 34 and the step portion 40 thus transition into each other.

The wall 50 is inclined towards the second axial cone end 22. It also is conceivable that the wall 50 includes an undercut.

In this second embodiment, the centering collar 28 also includes an undercut 52 which is directed towards the first sheet portion 34. Otherwise, the centering collar 28 is vertical towards the first sheet portion 34.

The manufacture of the synchronizer ring 10 of the second embodiment likewise differs from the manufacture of the synchronizer ring 10 of the first embodiment.

On the one hand, two different tools 46, namely a first tool and a second tool, are used, in order to form the step portion 40 and the centering collar 28.

On the other hand, both the first tool and the second tool are moved in direction towards the first axial cone end 20 parallel to the friction surface 18 proceeding from the second axial cone end 22.

FIG. 6 shows a third embodiment of the synchronizer ring 10, wherein for reasons of clarity the representation of the step portion 40 has been omitted.

In this embodiment the centering collar portions 44 are differently spaced from the second cone end 22.

For example, a first centering collar portion 44.1 is spaced from the second axial cone end 22 with a first axial distance $a_1$.

A second centering collar portion 44.2 is spaced from the second axial cone end 22 with a second distance $a_2$, which is different from the first axial distance $a_1$. For example, the first axial distance $a_1$ is smaller than the second axial distance $a_2$.

In the third embodiment shown in FIG. 6, the adjacent centering collar portions 44.1 and 44.2 directly transition into each other, so that a continuous centering collar 28 is obtained, which extends in circumferential direction in a wave-shaped manner. The axial dimension of the centering collar 28 thereby can be extended.

The design of the centering collar portions 44 according to the third embodiment can be combined with both designs of the step portion 40 of the first or second embodiment.

The remaining features of the illustrated embodiments can of course also be combined with each other as desired. For example, an undercut or an angled wall 50 can also be provided in the synchronizer ring 10 of the first embodiment.

The invention claimed is:

1. A synchronizer ring for a synchronization unit of a manual transmission, which includes a ring axis and a ring-shaped sheet-metal cone with a substantially constant ring thickness,
wherein the ring-shaped sheet-metal cone has a radial outer side and an opposite radial inner side with a cone-shaped friction surface, and
wherein the ring-shaped sheet-metal cone tapers in direction of the ring axis from a first axial cone end towards a second axial cone end,
wherein the sheet-metal cone has an integrally molded centering collar on the radial outer side for radially centering the synchronizer ring relative to a synchronizer hub of the synchronization unit,
wherein the sheet-metal cone is deformed in the region of the centering collar and includes a first sheet portion with a residual thickness reduced as compared to the ring thickness as well as axially adjacent a second sheet portion with a collar thickness which at least corresponds to the ring thickness,
wherein the sheet-metal cone includes a step portion which axially extends between the second axial cone end and the first sheet portion, wherein a radial outer side of the step portion is offset with respect to a radial outer side of the first sheet portion towards the ring axis.

2. The synchronizer ring according to claim 1, wherein the radial outer side of the step portion and/or the radial outer side of the first sheet portion extend substantially parallel to the ring axis.

3. The synchronizer ring according to claim 1, wherein the radial distance between the radial outer side of the step portion and the friction surface is constant axially along the step portion.

4. The synchronizer ring according to any of claim 1, wherein the residual thickness of the sheet-metal cone is substantially constant in the first sheet portion.

5. The synchronizer ring according to claim 1, wherein the sheet-metal cone has a bottom at its second axial cone end, which starting from the sheet-metal cone extends radially towards the ring axis.

6. The synchronizer ring according to claim 5, wherein the radial distance between the radial outer side of the step portion and the radial outer side of the first sheet portion is greater than the ring thickness and/or the residual thickness.

7. The synchronizer ring according to claim 5, wherein in axial direction the step portion is shorter than the bottom.

8. The synchronizer ring according to claim 1, wherein the step portion is approximately U-shaped in cross-section vertically to the ring axis.

9. The synchronizer ring according to claim 1, wherein the step portion includes a wall facing away from the first sheet portion, wherein in the wall an undercut is formed and/or the wall is inclined towards the second axial cone end.

10. The synchronizer ring according to claim 1, wherein the sheet-metal cone is bent radially to the outside at its first axial cone end and includes locking teeth.

11. The synchronizer ring according to claim 1, wherein the centering collar has a radial abutment surface for the synchronizer hub.

12. The synchronizer ring according to claim 1, wherein the centering collar is interrupted in circumferential direction.

13. The synchronizer ring according to claim 1, wherein the centering collar comprises several centering collar portions spaced in circumferential direction.

14. The synchronizer ring according to claim 13, wherein each centering collar portion has a radial abutment surface for the synchronizer hub and all radial abutment surfaces lie on a circular cylinder.

15. The synchronizer ring according to claim 13, wherein at least three centering collar portions are provided.

16. A method for manufacturing a synchronizer ring according to claim 1, comprising the following steps:
a) providing a ring-shaped sheet-metal cone which conically tapers in direction of the ring axis from a first axial cone end towards a second axial cone end and does not yet have a centering collar,
b) adjusting a first tool to a desired first radial position for integrally molding the step portion at the second axial cone end, and
c) shifting the first tool by forming the material in direction of the first axial cone end substantially parallel to the friction surface of the sheet-metal cone or substantially parallel to the ring axis.

17. The method according to claim 16, wherein a second tool, after the first tool has been shifted, is adjusted to a desired second radial position for integrally molding the centering collar at the second axial cone end and by forming the material then is shifted in direction of the first axial cone end substantially parallel to the friction surface of the sheet-metal cone or substantially parallel to the ring axis.

18. The method according to claim 17, wherein the first tool is equal to the second tool.

* * * * *